United States Patent [19]

Hilbert

[11] 3,784,233
[45] Jan. 8, 1974

[54] CABLE-TERMINATION ADAPTER
[75] Inventor: Wolfgang Herman Gustav Hilbert, Holzkirchen, Germany
[73] Assignee: Bunker Ramo Corporation, Oak Brook, Ill.
[22] Filed: Oct. 15, 1971
[21] Appl. No.: 189,628

[52] U.S. Cl. .................... 285/12, 174/87, 285/114, 285/179, 285/388, 285/169
[51] Int. Cl. ............................................ F16l 25/00
[58] Field of Search ...................... 285/12, 369, 179, 285/331, 387, 388, 169, 390, 321, 397, 114; 174/87

[56] References Cited
UNITED STATES PATENTS
2,152,504  3/1939  Scott et al. ..................... 174/87 X
1,803,577  5/1931  Weatherhead ................. 285/331 X
2,259,191  10/1941  Allen ............................. 285/397 X Primary Examiner—Dave W. Arola
Attorney—Frederick M. Arbuckle

[57] ABSTRACT

A straight-line backshell assembly providing strain relief and shield grounding for an electrical cable connector is separable between the tubular housing section which carries the cable gripping means and the rotatable-ring coupling section which is adapted to screw on the rear of the connector. For an angular backshell, an elbow section of the desired angle and an identical rotatable-ring coupling section are added to the straight-line backshell assembly.

2 Claims, 3 Drawing Figures

3,784,233

CABLE-TERMINATION ADAPTER

BACKGROUND OF THE INVENTION

1. Field of the Invention

This invention relates to cable-termination housings for joining the end of a cable to a mating receptacle; such housings are known in the art as "back shells", customarily provide strain relief, and sometimes provide electrical conductivity from the cable shield to the metal shell of the mating receptacle.

2. Description of the Prior Art

In order to join the end of a cable to a cable receptacle or plug connector, it is known to provide the end of the cable with a cable-termination housing, here referred to as a back shell. The back shell serves to relieve the load exerted on the cable terminals, protecting them against both axial pull and twisting of the cable. The back shell is frequently provided with packings which form a waterproof seal to protect the terminals from the outside environment. The back shell is provided at one end with a coupling section for engagement with the rear thread of a mating cable receptacle, and at the other end with a cable gripping means.

In order to fasten cables to connectors at angles which deviate from the axis of the connectors, angular back shells have been developed. These are similar to the straight line back shells in that they are provided with a coupling section for engagement with the mating receptacle and with a curved or angular housing complete with strain relief means for gripping the cable. These curved or angular back shells are expensive to produce, and differently curved shells must be maintained in stock for each degree of curve required. Consequently, a business engaged in cable connecting work must maintain an expensive stock of back shells in order to have available the entire variety of differently curved housings.

SUMMARY OF THE INVENTION

It is an object of the present invention to provide an angular adapter for use with cable-termination housings which is more economical than present curved back shells, by permitting conversion of a straight-line back shell to an angular one.

According to the invention, an intermediate tubular elbow is provided having a change in angle from one end to the other which corresponds to a predetermined angle desired for joining the cable to the mating receptacle. The cable gripping portion of a straight line back shell is joined to one end of the tubular elbow, and the same coupling section used in a straight line backshell is joined to the other end of the tubular elbow for coupling to the mating receptacle.

The intermediate tubular elbow is not provided with a device for cable gripping, since such a device is situated in the rear part of the straight line back shell to which the intermediate tubular elbow is fastened. Therefore, the intermediate tubular portion is economical to manufacture and a large stock of all needed curved intermediate tubular portions can be maintained at low cost. When a straight cable connection is desired, the straight line back shell is attached directly to the mating cable receptacle without using an intermediate tubular elbow and without requiring any additional fittings.

It is possible to join several intermediate tubular portions between the mating receptacle and the linear housing of the cable. For example, cable outlets can be created at angles of 60° or 90° by combining various curved intermediate sections having angles of 30°. The ability to combine various intermediate tubular sections reduces the number and variety of such sections which must be kept in stock. Further, the intermediate tubular portions can be connected to make compound angles or offsets. Such a non-planar configuration is sometimes desirable when the space available at the point of the cable connection is very limited.

DESCRIPTION OF THE PREFERRED EMBODIMENTS

The invention will now be described in detail with reference to the accompanying drawings representing preferred embodiments of a back shell assembly according to the present invention.

Figure 1:
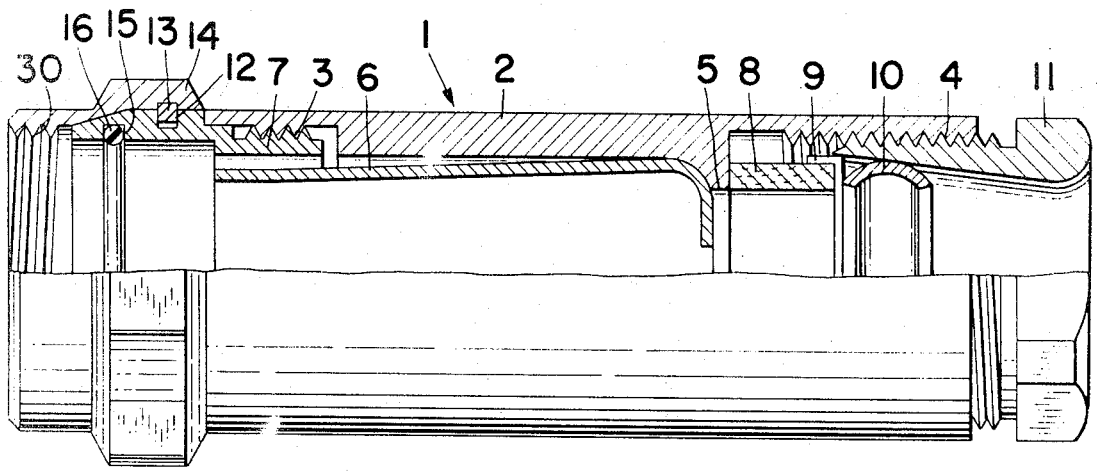
FIG. 1 is an enlarged, partial cross section of a straight line back shell assembly.

The straight line backshell shown in FIG. 1 is provided with a tubular body 2 whose internal diameter varies and which carries internal threads 3 and 4 at its ends. A ring 7 is provided with a thread which can be screwed into internal thread 3 of the body 2. Around its outside perimeter, threaded ring 7 is provided with an annular groove 12 in which a snap-ring (or safety ring) 13 is inserted. Snap-ring 13 retains coupling nut 14. An O-ring 16 is inserted into annular groove 15 on the inside wall of threaded ring 7. Coupling nut 14, along with threaded ring 7, snap-ring 13 inserted in groove 12, and O-ring 16 inserted in annular groove 15, comprise a coupling section for attaching the back shell assembly to a receptacle or other electrical connector (not shown) by engagement of the threads 30 therewith. The tubular body 2 is divided into two compartments by a reduction in cross section forming a shoulder 5. At the left of the shoulder, as seen in FIG. 1, the body carries a clamping sleeve 6, which is used to press the cable shielding to the inside wall of tubular section 2, the shielding being drawn over the outside of sleeve 6. By screwing the coupling nut 14 onto a receptacle or other electrical connector, clamping sleeve 6 is pressed against the shoulder 5 by the abutment of the connector against the left end of sleeve 6. Thus the shield is gripped between the sleeve 6 and the shoulder 5, and electrical conductivity is provided from the shield to tubular body 2 and the coupling section.

The compartment of tubular section 2 to the right of shoulder 5 in FIG. 1 carries cable gripping or strain relief means which include an annular cable packing 8, a sleeve 9 extending beyond the edge of the annular packing 8, a tensioning ring 10 engaging sleeve 9, and a tightening nut 11 screwed into internal thread 4. The inside of tightening nut 11 is conically shaped and engages tensioning ring 10 with a conical surface. Thus, as nut 11 is screwed home, the cross section of tensioning ring 10 is narrowed, tensioning ring 10 is pressed against the cable periphery and the cable is firmly held in straight line backshell 1.

Figure 2:
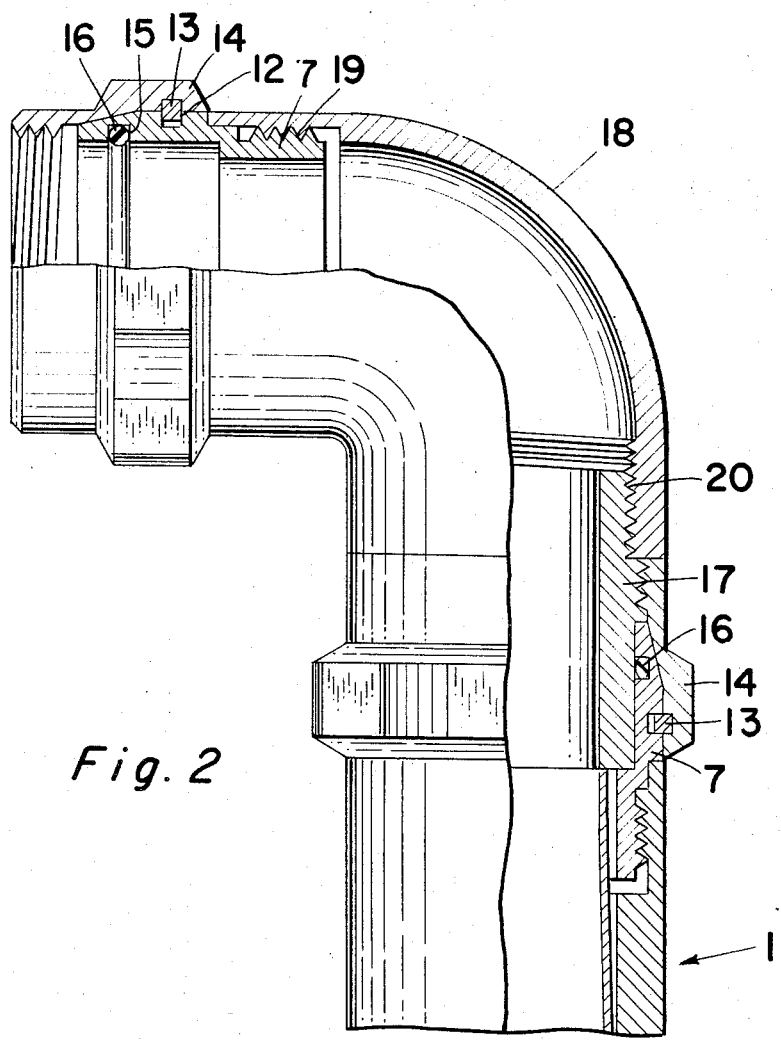
FIG. 2 is an enlarged, partial cross section of a back shell assembly having a 90° bend.

FIG. 2 shows a curved intermediate tubular elbow portion 18 forming a 90° angle. The intermediate section 18 is provided with internal threads 19 and 20 at its ends, thread 19 being the same as thread 3 in FIG. 1. A coupling section comprising parts 7 and 12–16, as described with reference to FIG. 1, is screwed into an internal thread 19. An adapter memeber 17 is provided with appropriate thread for joining the threads 20 of elbow 18 and the threads in coupling nut 14 of a straight line back shell, identical to that shown in FIG. 1. The only new piece parts necessary, other than those are the adaptor 17 and the elbow 18 shown in FIG. 1.

Figure 3:
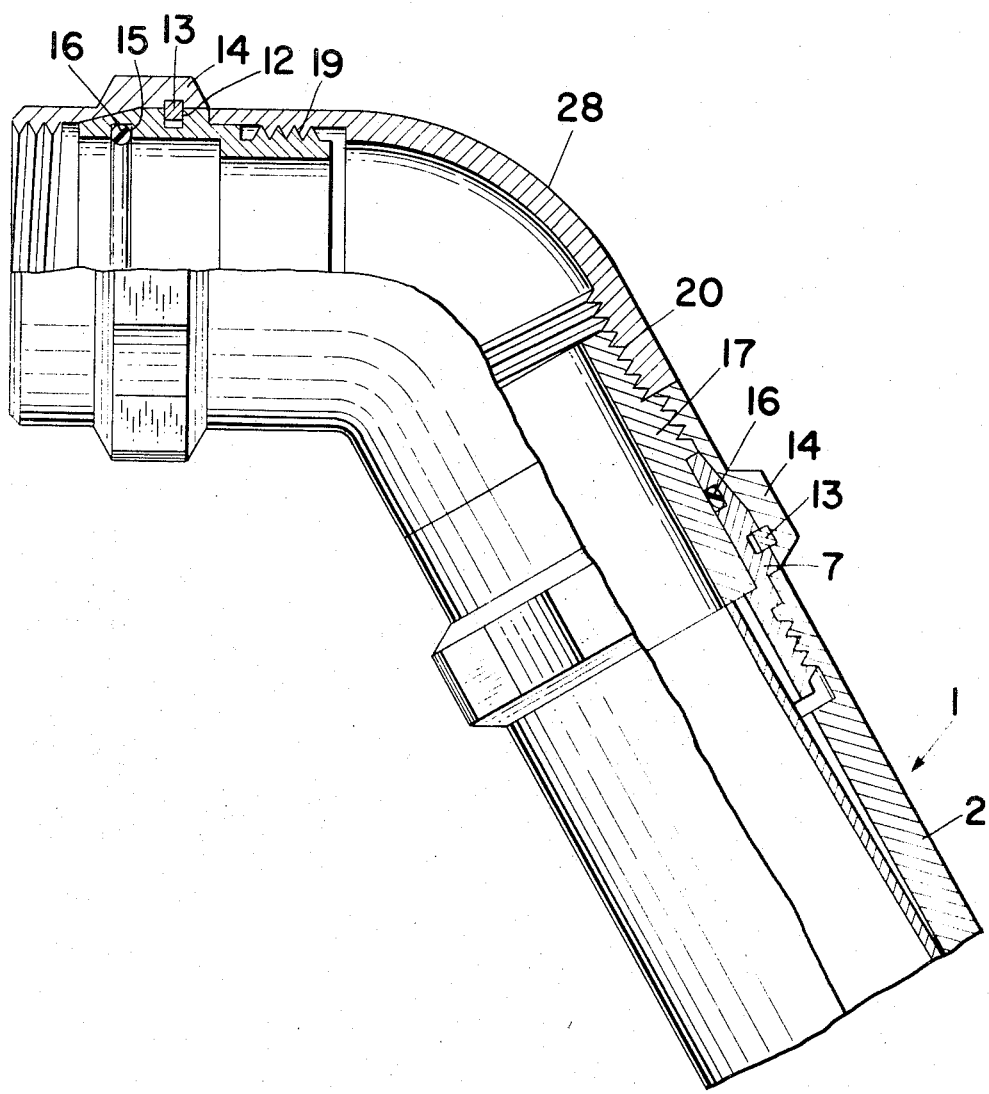
FIG. 3 is an enlarged, partial cross section of a cable-termination adapter having a 60°bend.

FIG. 3 shows another example of an angular intermediate tubular portion, here designated as 23. In contrast to the 90° angular intermediate tubular portion 18 shown in FIG. 2, the intermediate tubular portion 28 shown in FIG. 3 is curved to an angle of 60°. Apart from the difference in angle, the intermediate tubular portions in FIGS. 2 and 3 are similar.

It will be noted in the assemblies as shown in FIGS. 2 and 3 that rotatable coupling nuts 14 are found at each end of the angular elbows 18 or 28. This is essential because after a cable passing through the back shell assembly has been attached to an electrical connector, the back shell cannot be rotated relative to the connector in order to join their respective threaded portions; this would twist the cable, or the conductors thereof. Hence a rotatable coupling nut 14 is necessary, as at the left end of the assembly in each of the figures. When an elbow is used, as in FIGS. 2 and 3, it is also necessary to provide a rotatable coupling nut between the elbow and the straight line back shell 1, because the shield of the cable is bound between the sleeve 6 and the inner wall of the tubular body 2. Consequently the straight line back shell portion cannot be rotated relative to the elbow (with the cable conductors extending through it) for joining of their respective threaded portions, and a rotatable coupling nut is necessary for this junction also.

What is claimed is:

1. An angular back shell assembly for providing strain relief in attachment of a cable to an electrical connector, comprising in connected sequence and in combination,
    a first coupling section,
    a tubular elbow member having different internal threads at its two ends,
    an adapter having two differently threaded portions,
    a second coupling section, and
    a straight tubular body having internal threads in at least one end thereof,
        said first and second coupling sections being interchangeable, each consisting of
            a ring externally threaded to fit a mating thread either in one end of said tubular elbow member or in said one end of said tubular body, and
            a coupling nut rotatably carried on said ring and internally threaded to fit either an electrical connector or one threaded portion of said adapter,
    said first coupling section threadedly attached to one end of said elbow and said second coupling section threadedly attached to one of said threaded portions on said adapter and to said internal threads on said straight tubular body,
    the other threaded portion of said adapter mating with the thread in the other end of said tubular elbow member, and
    said tubular body carrying strain relief means adapted for gripping a cable extended therethrough.

2. An angular back shell assembly for providing strain relief in attachment of a cable in an electrical connector, comprising in connected sequence and in combination,
    a first coupling section,
    a tubular elbow member having an internal thread at one end and having externally threaded means at its other end,
    a second coupling section, and
    a straight tubular body having internal threads in at least one end thereof,
        said first and second coupling sections being interchangeable, each consisting of
            a ring externally threaded to fit a mating thread either in said one end of said tubular elbow member or in said one end of said tubular body, and
            a coupling nut rotatably carried on said ring and internally threaded to fit either an electrical connector or said externally threaded means of said elbow member,
    said first coupling section threadedly attached to said internal threads of said elbow, said second coupling section threadedly attached to said external threaded means on said elbow and to said internal threads on said straight tubular body, and
    said tubular body carrying strain relief means adapted for gripping a cable extended therethrough.

* * * * *